United States Patent [19]

Tippmann

[11] Patent Number: 5,662,959
[45] Date of Patent: Sep. 2, 1997

[54] METHOD FOR STEAM COOKING A MEAT PRODUCT

[76] Inventor: Eugene R. Tippmann, 2509 E. 1200 N., Roanoke, Ind. 46783

[21] Appl. No.: 601,604

[22] Filed: Feb. 14, 1996

Related U.S. Application Data

[60] Division of Ser. No. 310,756, Sep. 26, 1994, abandoned, which is a continuation-in-part of Ser. No. 99,418, Jul. 30, 1993, abandoned, which is a continuation-in-part of Ser. No. 852,785, Mar. 17, 1992, Pat. No. 5,235,903.

[51] Int. Cl.$^6$ .............................. A23L 1/31; A23L 1/314
[52] U.S. Cl. .............................. 426/641; 426/510
[58] Field of Search .................. 426/510, 511, 426/641; 99/467, 472, 352, 443 C

[56] References Cited

U.S. PATENT DOCUMENTS

| | | | |
|---|---|---|---|
| 3,800,778 | 4/1974 | Lohr et al. | 126/369 |
| 4,011,805 | 3/1977 | Vegh et al. | 99/467 |
| 4,058,635 | 11/1977 | Durth | 426/509 |
| 4,137,337 | 1/1979 | Lohr et al. | 426/637 |
| 4,173,215 | 11/1979 | Bureau et al. | 126/369 |
| 4,256,775 | 3/1981 | Kunz | 426/510 X |
| 4,344,973 | 8/1982 | Blake et al. | 426/264 |
| 4,363,263 | 12/1982 | Williams | 99/352 |
| 4,528,975 | 7/1985 | Wang | 126/369 |
| 4,582,047 | 4/1986 | Williams | 99/443 C |
| 4,721,623 | 1/1988 | Coffey et al. | 426/250 |
| 4,753,809 | 6/1988 | Webb | 426/235 |
| 5,147,671 | 9/1992 | Winkler | 426/140 |

FOREIGN PATENT DOCUMENTS

| 2618981 | 2/1989 | France | 426/511 |
|---|---|---|---|

*Primary Examiner*—Arthur L. Corbin
*Attorney, Agent, or Firm*—Sixbey, Friedman, Leedom & Ferguson, P.C.; Gerald J. Ferguson, Jr.; Donald R. Studebaker

[57] ABSTRACT

A meat product, and apparatus and method of producing the same including a piece of meat which is heat treated to have no outer skin about its surface is disclosed. The meat is placed inside of an air-tight chamber, in which the meat is to be cooked, wherein steam is generated from a source of water and is introduced into the cooking chamber. The steam heats the inside of the cooking chamber and serves as a heat transfer media to heat the meat product. The steam and pressure within the cooking chamber are regulated so as to create an atmospheric humidity of 100% within the chamber, so any water present within the meat is prevented from evaporating into the atmosphere of said cooking chamber. The pressure within the cooking chamber may also be reduced so as to produce a low temperature steam from 150° to 180° F. to cook the meat product. A flavored ingredient, such as liquid smoke, may be added to the water utilized in generating the steam in order to flavor the meat product being cooked. Additionally, the pressure within the cooking chamber can be further reduced after the steam has been heat treating the meat for a predetermined time period, so that a thin layer of skin can be formed on the surface of the meat product, if desired.

4 Claims, 2 Drawing Sheets

METHOD FOR STEAM COOKING A MEAT PRODUCT

This is a Divisional application of Ser. No. 08/310,756, filed Sep. 26, 1994, now abandoned which is a continuation-in-part application of Ser. No. 08/099,418, filed Jul. 30, 1993, now abandoned, which is a continuation-in-part application of Ser. No. 07/852,785, filed Mar. 17, 1992 now U.S. Pat. No. 5,235,903.

BACKGROUND OF THE INVENTION

1. Technical Field

The present invention relates to an apparatus and method of producing a skinless meat product and in particular to the skinless meat product itself.

2. Background Art

Traditionally, boneless meat products, such as hams, have been cooked in large smoke houses to provide additional flavor to the ham. The meats are usually placed in porous bags which allow the smoke flavor in the smoke house to penetrate through the bag and into the meat product itself. During the cooking operation, the high temperature in the smoke house causes the fiber in the meat to shrink inducing the juices in the meat to purge to the surface of the meat. The juice in the meat generally consists of water, animal protein, and salt. The water contained in the juice on the surface of the meat evaporates away during the cooking process, which leaves behind a residue of protein and salt. The protein and salt residue is exposed to the high temperatures of the smoke house which cause the residue to coagulate, thus forming a skin on the surface of the meat.

The resulting skin on the surface of the meat is usually harder than the rest of the cooked meat product. Such a hardened skin is generally undesirable in taste and appearance to most consumers, especially when the meat product is used as a sandwich meat.

U.S. Pat. No. 4,721,623 to Coffey et at. discloses cooking a meat product in an environment sufficiently humid to reduce the evaporation of water contained in a coloring spray which is used within the environment. However, this process is to be used in conjunction with a meat product having a skin on its surface. Therefore, the process allows some evaporation within the environment and does not disclose an environment having 100% humidity which prevents any evaporation of water.

The use of steam as a heat transfer medium is well known in the prior art. Such steam cooking devices may employ the steam at atmospheric pressure as in U.S. Pat. No. 4,011,805 with convection heat transfer. Steam as the heat transfer medium at substantially atmospheric pressure with forced convection heat transfer is also known from U.S. Pat. No. 4,173,215. In this last patented arrangement, water is introduced into the bottom of a steam chamber and a heat source outside that chamber heats the water to produce steam. The chamber is vented so as to maintain the pressure within the cooking vessel at substantially atmospheric pressure. Such steam cooking devices may also employ the steam at an elevated pressure as in the common "pressure cooker." U.S. Pat. No. 3,800,778 discloses a steam cooker with a valve and pump arrangement so that the pressure within the cooking vessel can be maintained either above or below atmospheric pressure. However, these references do not disclose steam cooking food products at 100% humidity, which, if prepared in such manner, would ensure that a skin will not develop on the outer surface of the food product during the cooking process.

Accordingly, as can be seen from the foregoing, there is a need for a method of cooking a meat product without forming a skin on the outer surface thereof, wherein the meat product is placed in an environment which prevents the evaporation of water from the surface of the meat product.

SUMMARY OF THE INVENTION

It is a primary object of the present invention to overcome the aforementioned shortcomings associated with the prior art.

Another object of the present invention is to provide a meat product, and an apparatus and method of producing the same, wherein the meat product is cooked without forming a skin around its outer surface.

Yet another object of the present invention is to provide a skinless meat product, and an apparatus and method of producing the same where the meat product is cooked within a chamber in which the mount of water evaporation from the meat product can be regulated.

These as well as additional objects and advantages of the present invention are achieved by preparing a meat product wherein the meat product is heat treated to have no outer skin about its surface. The meat product is placed inside of an air-tight chamber, in which the meat product is to be cooked. Steam is generated from a source of water and is introduced into the cooking chamber, wherein the steam heats the inside of the cooking chamber and serves as a heat transfer media to heat the meat product. The steam and pressure within the cooking chamber are regulated so as to create an atmospheric humidity of 100% within the chamber, so any water present within the meat is prevented from evaporating into the atmosphere of said cooking chamber.

The pressure within the cooking chamber can be reduced so as to produce a controlled temperature steam from 160° to 212° F. to cook the meat product. Cooking the meat with a low temperature steam assists in preventing the outer surface of the meat from cooking faster than the inside portion of the meat. Additionally, a flavored ingredient, such as liquid smoke, may be added to the water utilized in generating the steam in order to flavor the meat product being cooked.

In the case where a thin skin on the surface of the meat product is desired, the pressure within the cooking chamber can be further reduced after the steam has been heat treating the meat product for a predetermined time period. The reduction in pressure causes the boiling temperature within the cooking chamber to drop, which allows any moisture present on the surface of the meat product to boil off leaving behind a protein and salt residue. The protein and salt residue, being exposed to the heat within the cooking chamber, coagulates so that a thin layer of skin will develop on the surface of the meat product.

The above noted method is carried out using an apparatus for cooking the meat product including an air-tight cooking chamber, a meat product support for supporting the meat product within the chamber, a source of steam and a control unit for maintaining a humidity level of 100% within the chamber. The apparatus further includes one of many devices for reducing the pressure within the chamber so as to control the cooking temperature within the chamber.

These as well as additional advantages of the present invention will become apparent from the following detailed description of the invention.

DETAILED DESCRIPTION OF THE PREFERRED EMBODIMENT

Figure 1:
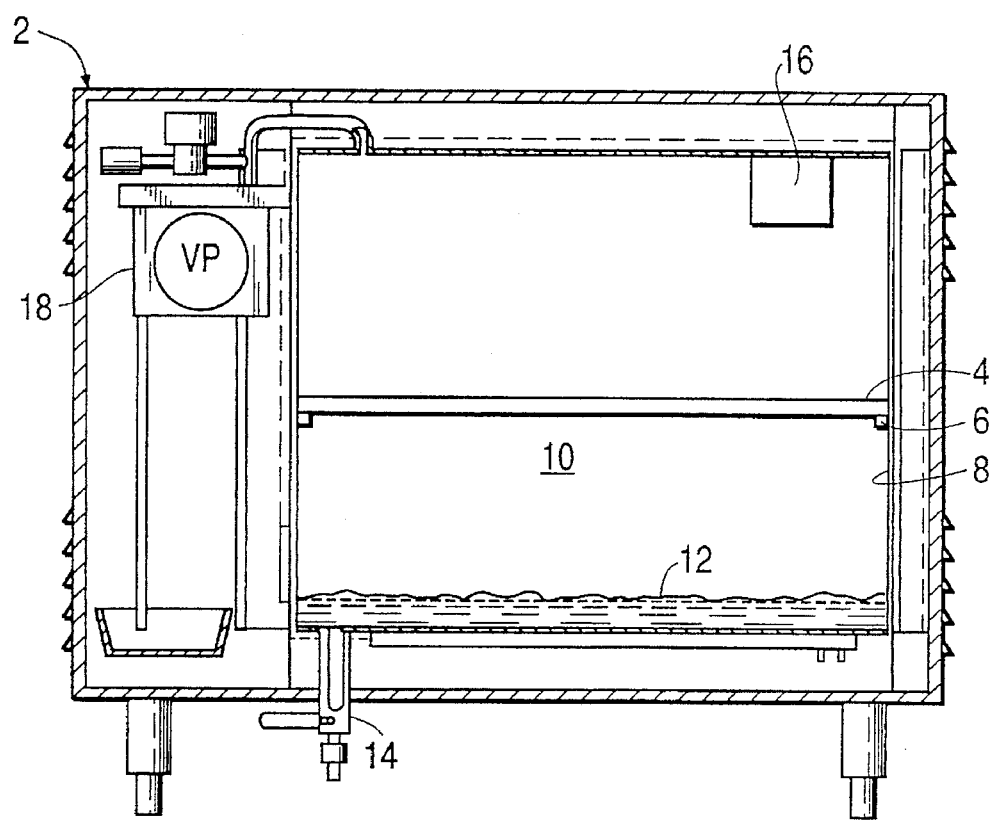
FIG. 1 is a sectional view of the steam cooker of the present invention.

The present invention provides for a new method of cooking a skinless meat product. The meat product of the present invention may be any meat which tends to obtain a skin thereon during conventional cooking, including pork, beef, and poultry. The process of preparing the meat product without a skin formed thereon comprises the steps of placing a meat product into a steam cooker, circulating steam within the steam cooker to heat the meat product, and creating an atmospheric humidity of 100% within the steam cooker.

Once placed within the steam cooker, the meat product is exposed to steam, which adds heat to the meat product in order to cook such product. The steam cooker may be a conventional steam pressure cooker, in which a single meat product, such as a ham, may be placed therein and may be used in the consumer's home. Alternatively, the steam cooker may include a large-scale cooking chamber wherein a plurality of meat products may be placed, such as a smoke house. An air-tight chamber is formed within the steam cooker, so that the atmospheric environment within the chamber may be controlled.

The amount of steam which is introduced into the chamber is regulated to maintain the level of atmospheric humidity within the chamber at 100%. In addition to providing a humid environment within the chamber, the steam is also used to cook the meat product by serving as a heat transfer media to heat the meat product. As the temperature of the meat product rises, some of the juice within the meat product is purged to the surface. The juice, comprising water, animal protein, and salt, builds up on the surface during cooking and runs off of the meat product taking the salt and protein with it. The water present in the juice cannot evaporate and thus leave the protein and salt behind, because the steam environment of 100% humidity will not permit water to evaporate within the steam cooker. Unlike previous cooking methods where water is evaporated from the juices leaving a residual of protein and salt behind to form a crust-like skin about the meat product, the meat product formed in accordance with the present invention does not leave the protein and salt behind to be cooked and thus forms a skinless meat product. Therefore, cooking the meat product in atmospheric humidity of 100% ensures that a skin will not develop on the surface of the meat product.

When exposing the meat product within the steam cooker to the high temperatures associated with steam, namely 212° F., the outer surface of the meat product tends to cook quicker than the inner portion of the meat product. In order to ensure that the inner portion of the meat product is adequately cooked, the outer surface of the meat product is often overcooked. Therefore, the process of cooking the meat product of the present invention may further include the step of placing the meat product into a reduced pressure steam cooker, wherein the meat product is subjected to a low temperature steam. Through lowering the pressure within the steam cooker, it is possible to obtain a steam having a lower temperature. Subjecting the meat product to a low temperature steam ensures that the meat product is more evenly cooked from its inner portion to its outer surface. This results in a higher quality meat product which is not cooked to different degrees within the meat product.

The pressure may be reduced within the steam cooker to regulate the temperature therein within a range from 160° F. to 180° F. The pressure within the steam cooker is adjusted to provide the adequate cooking temperature for the particular meat product being cooked. For instance, a low temperature steam of 165° F. is the optimal temperature when cooking a boneless ham. Depending upon the texture and thickness of the meat product being cooked, the temperature of the steam can be adjusted accordingly.

Another step in the process of preparing the skinless meat product may include the addition of a flavoring ingredient to the water which is used for generating the steam. Thereupon, the flavoring ingredient will be carried by the steam in the steam cooker, such that, as the steam is heating the meat product, the flavoring ingredient will be disseminated throughout the steam and absorbed by the meat product. Therefore, the meat product can be flavored as it is being cooked. Any flavoring ingredient which may suitably be added to the water and carried by the steam may be used, such as liquid smoke, garlic, or onion flavoring.

In the instances when it is desirous to have a small amount of skin on the meat product, such as with hotdogs and the like, a further step may be added to the cooking process which creates a slight skin on the meat product. A small amount of skin could be formed by stopping the steam supply and reducing the internal pressure within the chamber after the meat product is fully cooked, in order to cause the water contained in the juice on the surface of the meat product to boil off leaving a protein and salt residual behind. Therefore, after the meat product is cooked in an atmospheric humidity of 100% until it is fully cooked, the pressure within the chamber is reduced which, in turn, reduces the boiling temperature of water within the chamber. As the boiling temperature drops within the chamber, the water present in the juice of the meat product is now capable of evaporating.

The pressure in the steam cooker could be reduced to produce a slight skin on the meat product though the use of vacuum pump. The introduction of a cold surface into the cooking chamber would also reduce the pressure therein. The cold surface could comprise a pipe coil extending through the cooking chamber, wherein cold water or a refrigerant is circulated through the pipe coil when a reduction in pressure is desired. The cold surface would cause the steam within the cooking chamber to condense and thereby reduce the pressure, resulting in the water on the surface of the meat product boiling off. Alternatively, a spray of cold water into the cooking chamber would also achieve a similar result to the addition of a cold surface herein described.

While the above embodiments for reducing the pressure within the cooking chamber are described above, it is understood that any method of reducing the pressure within the cooking chamber would suffice in allowing the moisture from the meat product to evaporate.

Referring to FIG. 1, the apparatus of the present invention will now be set forth. The meat product may be positioned within steam cooker 2 onto a cooking rack 4. The cooking rack 4 is supported on its ends by protrusions 6 extending from the inner walls 8 of cooking chamber 10. When it is desirous to cook a plurality of meat products within cooking chamber 10, a series of cooking racks 4 may be positioned within the cooking chamber 10, while being spaced apart from each other a distance at least equivalent to the size of the meat product being cooked. In an alternative arrangement, the meat product could be hung within cooking chamber 10, such as by a hook or the like or placed on carts and manipulated within a large smoke house or oven.

The steam used for transferring heat to the meat product is generated by heating the water 12 within cooking chamber 10 to its boiling point. The water 12 is introduced into the cooking chamber 10 through a valve 14, which connects the inner cooking chamber 10 to a source of water. The steam used for cooking may alternatively be generated outside of the cooking chamber 10 and introduced into the cooking chamber 10 through valve 14. The amount of steam to be generated or introduced into cooking chamber 10 is controlled by thermostat 16 which determines the temperature within cooking chamber 10.

A vacuum pump 18 is provided for selectively removing air from within cooking chamber 10 and reducing the pressure therein. Reducing the pressure within the cooking chamber 10 thus reduces the temperature of the steam and eliminates overcooking which causes the meat product to become tough. The ideal temperature for cooking beef is approximately 155° Fahrenheit while the ideal temperature for chicken and pork is approximately 170° Fahrenheit. Consequently it is desirable to maintain the cooking temperature within the cooking chamber 10 in the range of 150° to 180° Fahrenheit. This can be accomplished by controlling the pressure within the cooking chamber 10.

The vacuum pump 18 may also be utilized for instantaneously reducing the internal pressure within the cooking chamber 10 enough to cause the water on the surface of the meat product to boil off leaving a skin behind. The small amount of skin is formed by stopping the steam supply and reducing the internal pressure within the chamber using vacuum pump 18 after the meat product is cooked. This results in the lowering the boiling temperature within cooking chamber 10 to below the boiling temperature of water on the surface of the meat product. Thus, the water contained in the juice on the surface of the meat product will boil off leaving a protein and salt residual behind.

Figure 2:
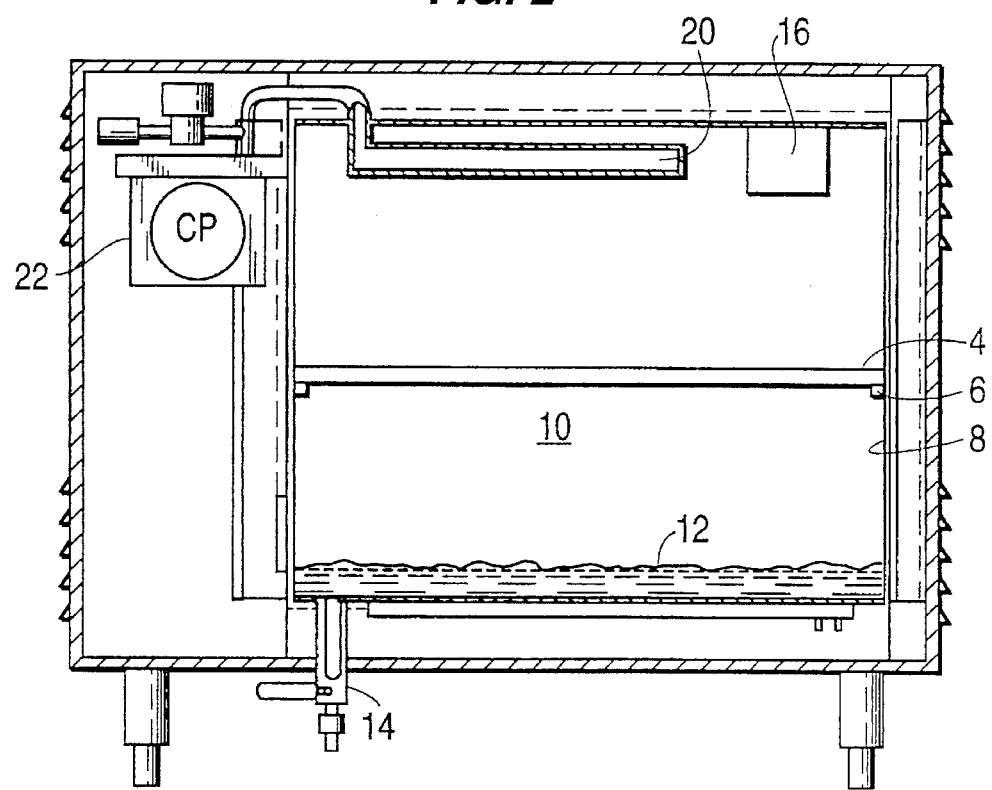
FIG. 2 is a sectional view of a second embodiment of the steam cooker of the present invention.

Referring now to FIG. 2, an alternative embodiment of the present invention is illustrated, wherein a piping tube 20 is positioned within cooking chamber 10 in order to reduce the pressure therein. The piping tube 20 has a refrigerant, such as freon or cold water, circulated therethrough by a circulating pump 22. When the refrigerant or cold water is circulated through piping tube 20, a cold surface within the cooking chamber 10 is created which causes the steam within the cooking chamber 10 to condense, thereby reducing the pressure within the cooking chamber 10. When the supply of steam into cooking chamber 10 has ceased and the refrigerant is introduced into piping tube 20, the further reduction in pressure will result in a drop in the boiling temperature causing the moisture to boil off the surface of the meat product which then forms a skin thereon. Therefore, piping tube 20 may used to achieve the same result as vacuum pump 18 in controlling the pressure within the cooking chamber 10.

Figure 3:
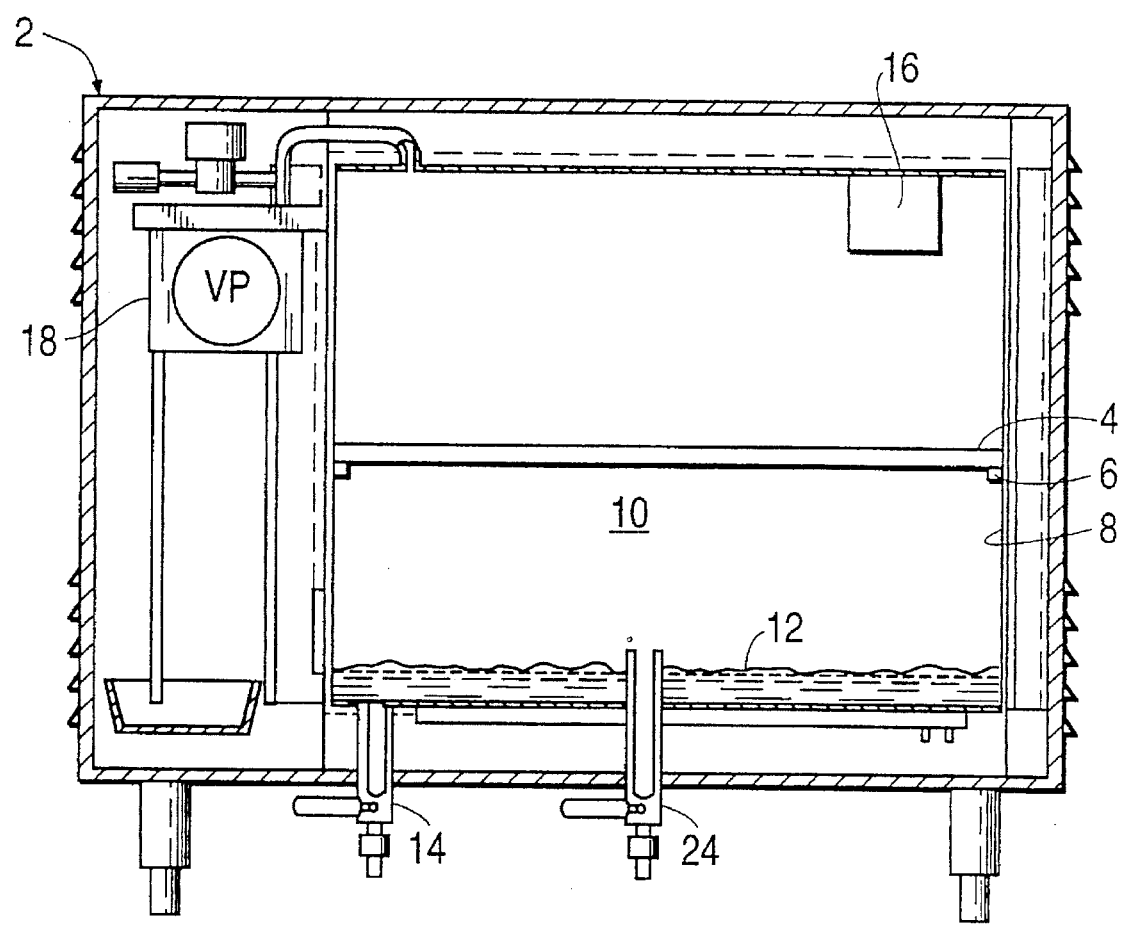
FIG. 3 is a sectional view of a third embodiment of the steam cooker of the present invention.

Referring now to FIG. 3, the pressure within cooking chamber 10 may also be instantaneously reduced by a spray of cold water into the chamber through injection valve 24. Towards the end of the cooking cycle for the meat product, the cold water spray is introduced into the cooking chamber which causes the steam to condense. Thus, the boiling temperature within the cooking chamber 10 will fall and the moisture on the surface of the meat product will boil off leaving the protein and salt residue behind.

As can be seen from the foregoing, a meat product prepared in accordance with the present invention will provide a product which is cooked without forming a skin about an outer periphery thereof. Moreover, by regulating the pressure within the steam cooking chamber, the temperature of the steam in the cooking chamber may be controlled which, in turn, allows the mount of water evaporation from the surface of the meat product to be controlled, thus allowing the formation of a skin on the surface of the meat product to be regulated to its desired level.

While the present invention has been described with reference to the preferred embodiment, it will be appreciated by those skilled in the art that the invention may be practiced otherwise then as specifically described herein without departing from the spirit and scope of the invention. It is, therefore, to be understood that the spirit and scope of the invention be limited only by the appended claims.

What is claimed is:

1. A method for producing a skinless meat product comprising the steps of:

placing a piece of meat into an air-tight cooking chamber;

generating steam from a source of water;

introducing said steam into said air-tight cooking chamber containing the meat;

reducing the steam pressure within said cooking chamber to achieve a low temperature steam in a range of 150° F. to 180° F.;

heat treating the meat with said low temperature steam to cook the meat; and creating an atmospheric humidity of 100% within said chamber using said low temperature steam, said atmospheric humidity of 100% preventing any water present within the meat from evaporating into the atmosphere of said cooking chamber.

2. The method as defined in claim 1, wherein said source of water used to generate said steam includes a flavored ingredient, said flavored ingredient adding a particular flavor to the meat product as said meat is being heat treated with said steam.

3. The method as defined in claim 2, wherein said flavored ingredient comprises liquid smoke.

4. The method for producing a meat product comprising the steps of:

placing a piece of meat into an air-tight cooking chamber;

generating steam from a source of water;

introducing said steam into said air-tight cooking chamber containing the meat;

reducing the steam pressure within said cooking chamber to achieve a low temperature steam in a range of 150° F. to 180° F.;

heat treating the meat with said low temperature steam to cook the meat;

creating an atmospheric humidity of 100% within said chamber using said low temperature steam, said atmospheric humidity of 100% preventing any water present within the meat from evaporating into the atmosphere of said cooking chamber; and then further reducing the steam pressure within said cooking chamber after said steam has been heat treating the meat for a predetermined time period, said reduction in pressure allowing moisture to boil off of a surface of the meat so that a thin layer of skin develops thereon.

\* \* \* \* \*